March 4, 1924.  C. J. MANUEL  1,485,622
MEASURING SERVER FOR ICE CREAM AND THE LIKE
Filed Sept. 7, 1922
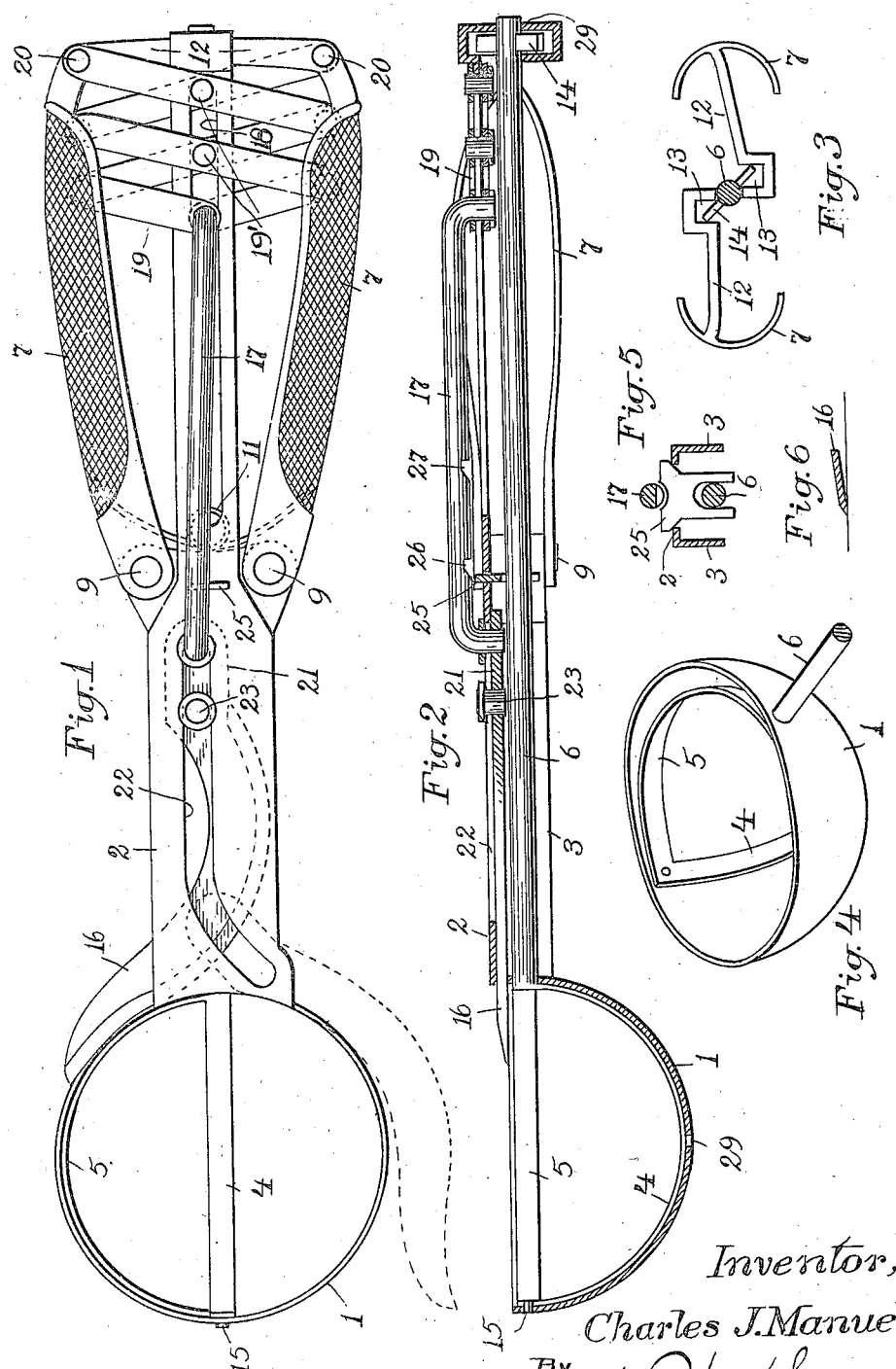
Inventor,
Charles J. Manuel;
By A. B. Upham,
Attorney.

Patented Mar. 4, 1924.

1,485,622

UNITED STATES PATENT OFFICE.

CHARLES J. MANUEL, OF TARRYTOWN, NEW YORK.

MEASURING SERVER FOR ICE CREAM AND THE LIKE.

Application filed September 7, 1922. Serial No. 586,758.

*To all whom it may concern:*

Be it known that I, CHARLES J. MANUEL, a citizen of the United States, and a resident of Tarrytown, in the county of Westchester and State of New York, have invented certain new and useful Improvements in Measuring Servers for Ice Cream and the like, of which the following is a full, clear, and exact specification.
In the serving of ice cream and the like it is customary to employ a cup-like measuring device provided with a device for leveling its contents flush with its mouth and to detach the contents from the surface of the cup to enable the same to be delivered to the customer.

The object of my invention is the effecting of means whereby such operations can both be performed by a simple gripping action upon the operating handle of the serving device.

In the drawings forming part of this specification, Fig. 1 is a plan view of an ice cream server embodying my improvements.
Fig. 2 is a side view of the same. Fig. 3 is an end view thereof. Fig. 4 is a perspective view of the measuring cup. Fig. 5 is a detail view of the locking device by means of which the server is kept inoperative so long as it is in a wrong position for proper use. Fig. 6 is a cross section of the measuring knife.

The serving cup 1 is preferably a hollow hemisphere, having a shank 2 rigid therewith and formed from sheet metal having deep strengthening flanges 3 at its edges. Within this cup are located two blades 4 and 5 rigidly united but in two planes at right angles to each other. These are attached to and operated by a slender shaft 6 passing through the wall of the cup 1 to the extreme end of the shank 2, so that a quarter-turn given to the latter will cause the two semi-circular blades 4, 5 to scrape the entire inner surface of the cup, each blade sweeping a quadrant.

Thus to turn the shaft 6, two oppositely disposed gripping handles 7 are pivoted at 9 to the shank 2, and normally pressed away from each other by any suitable means, as a spring 11. From the free end of each handle projects substantially at right angles thereto a finger 12 bent to form a recess 13 at its extremity. Into these recesses project the ends of a leaf 14 rigid with the shaft 6, whereby the compression of the handles forces the shaft to rotate for approximately a quarter-circle in one direction, while their return turns the shaft back to normal. A pin 15 projecting from the joined ends of the blades 4, 5 opposite the shaft into a hole in the cup 1 serves to more securely hold them within the cup.

For measuring or leveling off the ice cream scooped up in the cup 1, I provide a curved knife 16 having a double curvature in opposite directions. This knife is designed to be given both a pushing and a swinging action, whereby it cuts more easily the excess of ice cream from that in the cup. Thus to actuate the knife, its butt is joined by a slender rod 17 to a lazy-tongs 19 whose opposite end is pivoted at 20 to the handles 7, and so disposed that the compression of the handles projects the rod 17 and hence the knife toward the cup 1. For the control of the knife its butt 21 has two members slidable along a slot 22 cut in the shank 2. One of these members is a pin 23 and the other is the bent over portion of the rod 17. The portion of the slot 22 near the cup 1 is curved to one side so that after the forward push given to the knife has carried it nearly across the margin of the cup, it is then swung across the latter to the position shown in Fig. 1 in dotted lines, thus not only completely severing the excess cream from that in the cup, but locating the knife at one side of the edge of the cup to permit the unimpeded delivery of the ice cream therefrom.

I prefer to incline the under surface of the knife 16 in such a manner that its edge alone contacts with the ice cream beneath it, thereby preventing the suction and consequent resistance to the passage of the knife over the same. This is illustrated in Fig. 6.

I also find it wise to lock the operative parts against actuation prematurely. To this end, I provide a locking device which will not release the operative mechanism except when the cup is in an approximately horizontal position. Otherwise, the person serving the ice cream may press the handles 7 while he is dipping up the same and thereby have the knife at the wrong side of the cup for properly removing the excess therefrom. Moreover, if the handles are compressed after he has dipped up the cream but before it is delivered, he may deposit it all back into the freezer and so have to dip again. But by having it so constructed that it will operate only when nearly horizontal laterally, the server must be brought up from the freezer before it can measure and separate the excess; then the attendant presses the handles toward each other, tips off the excess cut therefrom, and finally turns the serving cup upside down over the customer's dish and delivers thereto the accurately measured ice cream.

Such a lock is shown in Fig. 5 and consists of a tumbler 25 bifurcated to loosely straddle the shaft 6, and so disposed that when the shank 2 is laterally inclined to a considerable degree, the upper edge of the tumbler will engage with a notch 26 formed in the rod 17 and thereby prevent the rod and hence the other parts from operating. The second notch 27 serves a similar purpose in case the rod may have already moved its notch 26 beyond the tumbler 25.

As shown in Fig. 2, the cup 1 is provided with a small hole 28 through its lowermost point for the purpose of admitting the air within the cup when its contents are being emptied therefrom. Without such inlet, there is a liability of such a suction beneath the ice cream as will retard the delivery of the same.

For properly guiding the members of the lazy-tongs 19, the pivots 19' thereof are located in a slot 18 formed in the rear section of the shank 7; and the extreme end of the latter is bent over and provided with a hole 29 to serve as a bearing for the end of the shaft 6.

What I claim is:

1. A server for ice cream and the like, comprising a cup, a curved knife and means for sweeping said knife across the mouth of said cup, said means being constructed first to move the knife substantially in the direction of its length and then laterally.

2. A server for ice cream and the like, comprising a cup, a shank rigid therewith having a longitudinally disposed slot therein, said slot being laterally curved adjacent the cup, a curved knife having its butt slidably held by said slot, and means for moving said knife along said slot.

3. A server for ice cream and the like, comprising a cup, a shank rigid therewith, a knife movably supported by said shank, a handle pivoted to said shank, and a lazy-tongs connected with said handle and knife for the actuation of the latter by the movement of the handle.

4. A server for ice cream and the like, comprising a cup, a shank rigid therewith, a knife movably supported by said shank, a pair of oppositely disposed compression handles pivoted to said shank, and a lazy-tongs connected with said handles and knife for the actuation of the latter by the elongation of the lazy-tongs.

5. A server for ice cream and the like, comprising a cup, a shank rigid therewith having a longitudinally and laterally disposed slot, a knife having its butt slidably carried by said slot, a pair of pressure handles pivoted to said shank, a lazy tongs connected with said handles, and a slender rod connecting said lazy-tongs and knife for the latter's actuation.

6. A server for ice cream and the like, comprising a cup, means for separating and measuring its contents, said means including a notched rod, and a gravity tumbler adapted for engaging said rod and preventing actuation of said means when the cup is in certain positions.

7. A server for ice cream and the like, comprising a cup having a shank, a knife or cleaver, a lazy-tongs for operating said knife and pivoted handles for operating said lazy-tongs, said shank having a longitudinal slot and the lazy-tongs having parts slidable along said slot.

In testimony that I claim the foregoing invention, I have hereunto set my hand this 5th day of September, 1922.

CHARLES J. MANUEL.